United States Patent [19]

Desaga

[11] Patent Number: 5,470,024
[45] Date of Patent: Nov. 28, 1995

[54] HAND-OPERATED UTENSIL FOR CRUSHING GRANULAR FOODS

[76] Inventor: Hans Desaga, Am Gänsberg 13, D-64658 Fürth, Germany

[21] Appl. No.: 220,503

[22] Filed: Mar. 31, 1994

[30] Foreign Application Priority Data

Mar. 31, 1993 [DE]  Germany ............................ 9304855 U

[51] Int. Cl.⁶ ...................................... B02C 4/32
[52] U.S. Cl. ....................... 241/234; 241/169.1; 241/231; 241/285.1
[58] Field of Search ................................. 241/168, 169.1, 241/230, 234, 221, 227, 231–233, 285.1

[56] References Cited

U.S. PATENT DOCUMENTS 442,764   12/1890  Brennan, Jr. ............................ 241/230
1,048,332 12/1912  Miller .................................... 241/230
3,066,876 12/1962  Verdier ................................ 241/230 X
5,154,364 10/1992  Ketting ................................ 241/230 X

FOREIGN PATENT DOCUMENTS 854872  11/1952  Germany ................................ 241/230

Primary Examiner—Timothy V. Eley
Attorney, Agent, or Firm—Antonelli, Terry, Stout & Kraus

[57] ABSTRACT

A utensil for crushing granular foods is disclosed. The utensil includes at least two crushing rolls which are mounted in side plates. At least the side plates are made from plastic. The side plates have side plate legs separated by a slot. Each side plate leg has a roll mounted thereon. The side plate legs are braced against one another to reduce a width of the slot. Each of the side plates is constructed in one piece and is disposed on a frame.

14 Claims, 1 Drawing Sheet

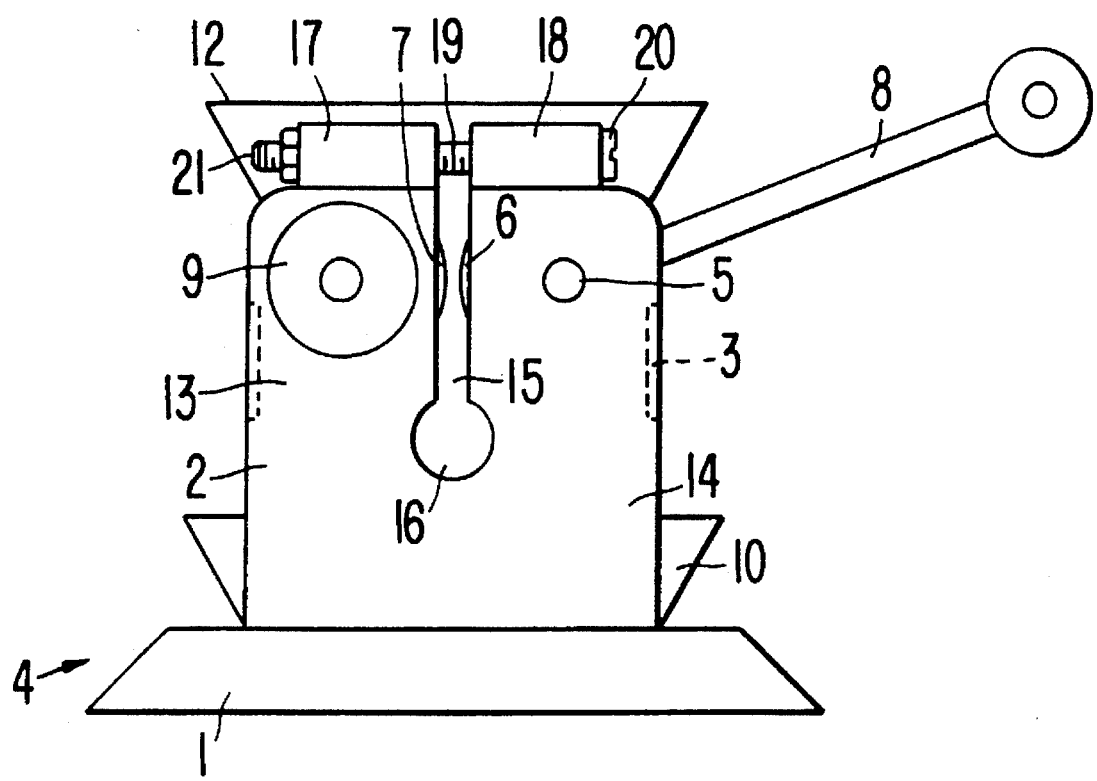

HAND-OPERATED UTENSIL FOR CRUSHING GRANULAR FOODS

TECHNICAL FIELD

The invention relates to a hand-operated utensil for crushing granular foods, such as in particular cereal grains, having at least two crushing rolls mounted in frontal side plates.

BACKGROUND ART

Such hand-operated utensils are constructed as small kitchen utensils with which, by means of rotating a crank acting on at least one crushing roll, the foods particularly cereal grains and more especially oat grains or the like, can be crushed to flakes. The driving of a further roll takes place by friction during crushing or by means of separate, meshing gear wheels.

A known kitchen utensil has a supporting frame made from metal. It can be constructed with bearings having limited tolerances, which undergo no modification in operation over a period of time. However, the manufacture of a metal frame is complicated and expensive.

DISCLOSURE OF THE INVENTION

The problem of the invention is therefore to provide an inexpensive, more attractive hand-operated utensil, but which still makes it possible to maintain a desired narrow crushing gaps and a close tolerance with respect to the minimum, settable spacing of the rolls over a long operating period.

According to the invention this problem is solved in the case of a hand-operated utensil of the aforementioned type in that at least the side plates are made from plastic the side plates have side plate legs separated by a slot, each side plate leg is mounted a roll and the side plate legs can be braced against one another accompanied by the reduction of the slot width. As a result of the construction of at least the side plates, but preferably the entire holding frame for the plastic rolls, in which the side plates are in particular constructed in one piece with the frame, a less expensive manufacture and also a more attractive and more easily cleanable hand-operated utensil for crushing foods is provided. The rolls are mounted in the plastic side plates. To avoid the disadvantage of expansion of the bearings leading to larger tolerances, so that the minimum slot width is increased, according to the invention the side plates are constructed with side plate legs between which a slot is formed with each side plate being mounted on one of the adjacent rolls. In addition, the side plate legs are braced against one another. If it is found that the gap between the rolls is too large in order to obtain a desired crushing of the food, then the side plates can be braced against one another by means of the provided clamping device, so that the rolls can be further moved with respect to one another and consequently the gap between them is reduced, if it has widened during operation due to the expansion of the bearings.

The clamping device can be constructed in different ways. In a preferred development, the legs are braced against one another by at least one screw and in particular on the top of the side plate legs are constructed with abutments with openings, through which is passed the screw.

In order to obtain a high flexibility of the side plate legs, according to a further development of the invention the underside of the slot is widened and in particular the widening is formed by a circular recess. Whereas the side plate legs and therefore the slot between them can extend over the entire height of the side plates and up to a base plate, particularly if the entire supporting structure or frame for the rolls is constructed in one piece, it has proven to be sufficient for the upwardly open slot to extend over roughly half the height of the side plates.

BRIED DESCRIPTION OF THE DRAWINGS

Further advantages and features of the invention can be gathered from the following description of an embodiment of the invention, with reference to the attached drawing which shows the hand-operated utensil according to the invention in a side view.

BEST MODE FOR CARRING OUT THE INVENTION

The hand-operated untensil according to the invention in the form of a small kitchen utensil for crushing granular foods, such as in particular cereal grains and especially oat grains or the like, has a base plate 1 which can be fixed to a table or the like and from which extend at the two end faces and upwards side plates 2, which are interconnected by connecting parts 3 at a distance from the plate 1, which provides a more stable frame or structure 4, which in the illustrated embodiment is constructed in one piece from plastic. By means of bearings 5, the side plates 2 carry crushing rolls 6, 7, one (in this case roll 6) being directly drivable by means of a crank 8, whereas the other (here roll 7) is concomitantly rotated by frontally positioned, gear wheels (not illustrated). The roll 7 is eccentrically mounted and can be adjusted in its spacing with respect to the roll 6 by means of an eccentric adjusting device 9. Beneath the rolls, 6, 7 there is a collecting tray 10 and above the rolls 6, 7 is a filling funnel 12.

The setting of the gap between the rolls 6, 7 must take place with a very small tolerance. As a result of the eccentric adjusting device 9 the gap width can be modified in stages of fractions of millimeters. As a result of the mounting of the rolls 6, 7 in the plastic side plates 2, it can occur that the tolerance is too large with respect to the spacing of the rolls particularly with the finest setting, so that the cereal grains can no longer be crushed in the desired way. To avoid this, the side plates 2 are constructed in the manner as illustrated in two parts with two side plate legs 13, 14, which are separated from one another by a slot 15, which at its lower end and roughly in the center of the height of the side plates 13, 14 has a circular widening 16. The side plate legs 13, 14 can also be adjusted relative to one another. For this purpose abutments 17, 18 are constructed in one piece on the side plate legs 13, 14 and have openings through which can be passed a screw 19, whose head 20 engages against an abutment 18, while onto its other end is screwed a nut 21, which engages against the other abutment, but is held or can be held in non-rotary manner. By screwing down the screw 20 and therefore screwing in or unscrewing with respect to the nut 21, the two abutments 17, 18 and therefore the side plate legs 13, 14 can be braced against one another or loosened, so that the desired minimum size of the gap between the rolls 6, 7 can be set in simple manner. In the case it the bearings 5 support the rolls 6, 7 become worn, the amount of wear can be compensated.

I claim:

1. A utensil for crushing granular foods comprising:
   at least two crushing rolls mounted in side plates, at least the side plates being made from plastic, the side plates having side plate legs separated by a slot, each side plate leg having a roll mounted thereon and the side plate legs being braced against one another to reduce a width of the slot with each of the side plates being constructed in one piece and disposed on a frame.

2. A utensil according to claim 1 wherein:

the legs are braced against one another by at least one screw.

3. A utensil according to claim 2 wherein:

a top of each of the side plate legs contains an abutment having an opening through which the at least one screw passes.

4. A utensil according to claim 3 wherein:

the slot is wider in a portion of the slot adjacent to the frame.

5. A utensil according to claim 4 wherein:

the portion is formed by a circular recess.

6. A utensil according to claim 2 wherein:

the slot is wider in a portion of the slot adjacent to the frame.

7. A utensil according to claim 6 wherein:

the portion is formed by a circular recess.

8. A utensil according to claim 1 wherein:

a top of each of the side plate legs contains an abutment having an opening through which a screw passes.

9. A utensil according to claim 8 wherein:

the slot is wider in a portion of the slot adjacent to the frame.

10. A utensil according to claim 9 wherein:

the portion is formed by a circular recess.

11. A utensil according to claim 1 wherein:

the slot is wider in a portion of the slot adjacent to the frame.

12. A utensil according to claim 11 wherein:

the portion is formed by a circular recess.

13. A utensil according to claim 1 wherein:

the slot extends to at least half a height of the side plates.

14. A utensil according to claim 13 wherein:

the slot extends to at least half a height of the side plates.

\* \* \* \* \*